(12) United States Patent  
Overtoom et al.

(10) Patent No.: US 8,295,200 B2  
(45) Date of Patent: Oct. 23, 2012

(54) DISCOVERING MULTICAST ROUTING CAPABILITY OF AN ACCESS NETWORK

(75) Inventors: Eric J. Overtoom, Mesa, AZ (US); Priya Rajagopal, Ann Arbor, MI (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 12/415,137

(22) Filed: Mar. 31, 2009

(65) Prior Publication Data

US 2010/0246579 A1    Sep. 30, 2010

(51) Int. Cl.  
*H04L 12/28* (2006.01)

(52) U.S. Cl. ..................................... 370/254

(58) Field of Classification Search .......................... None  
See application file for complete search history.

(56) References Cited

U.S. PATENT DOCUMENTS

| | | | | |
|---|---|---|---|---|
| 7,930,726 | B2* | 4/2011 | Sim et al. | 725/114 |
| 2006/0123448 | A1* | 6/2006 | Ma et al. | 725/51 |
| 2006/0126597 | A1* | 6/2006 | Chae et al. | 370/352 |
| 2006/0268697 | A1* | 11/2006 | Oz et al. | 370/229 |
| 2007/0081537 | A1* | 4/2007 | Wheelock | 370/392 |
| 2007/0097955 | A1* | 5/2007 | Li et al. | 370/352 |
| 2008/0068990 | A1* | 3/2008 | Wu | 370/229 |
| 2008/0109857 | A1* | 5/2008 | Goodwill et al. | 725/87 |
| 2008/0151911 | A1* | 6/2008 | Chen | 370/400 |
| 2008/0198848 | A1* | 8/2008 | Yamagishi | 370/390 |
| 2008/0301745 | A1* | 12/2008 | Liu et al. | 725/110 |
| 2009/0019469 | A1* | 1/2009 | Foti et al. | 725/27 |
| 2009/0036152 | A1* | 2/2009 | Janneteau et al. | 455/503 |
| 2009/0077609 | A1* | 3/2009 | Bichot et al. | 725/127 |
| 2009/0106803 | A1* | 4/2009 | Chen et al. | 725/103 |
| 2009/0113508 | A1* | 4/2009 | Foti | 725/118 |
| 2009/0147786 | A1* | 6/2009 | Li et al. | 370/390 |
| 2009/0164642 | A1* | 6/2009 | Foti | 709/227 |
| 2009/0183211 | A1* | 7/2009 | Yan et al. | 725/88 |
| 2009/0196213 | A1* | 8/2009 | Zhong et al. | 370/312 |
| 2009/0307307 | A1* | 12/2009 | Igarashi | 709/203 |
| 2009/0328112 | A1* | 12/2009 | Weaver | 725/87 |
| 2010/0005499 | A1* | 1/2010 | Covey | 725/109 |
| 2010/0122282 | A1* | 5/2010 | DuBose | 725/32 |
| 2010/0135297 | A1* | 6/2010 | Brousard et al. | 370/390 |
| 2010/0142530 | A1* | 6/2010 | Zha et al. | 370/390 |
| 2010/0182944 | A1* | 7/2010 | Kish | 370/312 |
| 2010/0197265 | A1* | 8/2010 | Dorenbosch et al. | 455/404.1 |

(Continued)

OTHER PUBLICATIONS

Levin, Orit, et al., "IPTV Consumer Domain Attachment and Initialization Specification", IIE-WT-020 R8, Architecture Task Force of the ATIS IPTV Interoperability Forum (IIF), The Alliance for Telecommunications Industry Solutions, Jul. 17, 2007.

*Primary Examiner* — Timothy J Weidner  
(74) *Attorney, Agent, or Firm* — Lori Anne D. Swanson (57) ABSTRACT

Whether an access network supports multicast-based IPTV services from an IPTV service provider is determined. A tone signal encoded with information for the IPTV service provider is used by a terminal to determine whether an access network supports multicast-based IPTV services. The tone signal is also used to determine whether collisions with other IPTV service providers on the access network is probable. Alternatively, a registration request including information for the access network is sent from the terminal to the IPTV service provider. The IPTV service provider uses information in the registration request to determine whether the access network supports multicast-based IPTV services.

13 Claims, 5 Drawing Sheets

U.S. PATENT DOCUMENTS

| | | | |
|---|---|---|---|
| 2010/0199305 A1* | 8/2010 | Lee et al. | 725/38 |
| 2010/0229211 A1* | 9/2010 | Lee et al. | 370/390 |
| 2010/0238924 A1* | 9/2010 | Liu | 370/390 |
| 2011/0149961 A1* | 6/2011 | Jarredal | 370/390 |
| 2011/0252438 A1* | 10/2011 | Tremblay et al. | 725/9 |
| 2011/0299529 A1* | 12/2011 | Olsson et al. | 370/390 |

* cited by examiner

DISCOVERING MULTICAST ROUTING CAPABILITY OF AN ACCESS NETWORK

BACKGROUND

Multicast IP (Internet Protocol) technology simultaneously delivers a single stream of packets to an arbitrary number of receivers. Multicast IP is used in situations where a large number of terminals are to connect to a stream of data, such as in an IP based TV system where a large number of subscribers may be watching a live transmission at the same time. By using multicast IP, only a single copy of a packet is created on each subnetwork (or subnet) where there is a subscriber who wishes to receive that packet stream. When there is no subscriber in that subnet, the router will not forward the multicast packets into the subnet. Thus, multicast IP technology conserves bandwidth by replicating the packet stream only as required.

The alternative to using multicast IP in the network is that a unique copy of each packet is sent to each terminal. This requires that the IP header on each packet be created uniquely for each terminal, and the number of users watching that particular stream times the bandwidth for is required. This unicast mode of operation likely will cause problems during popular events, such as the Super Bowl, since the network would need to be over-provisioned to support that number of subscribers, even though that number of streams will rarely actually be in use.

In a fixed access network environment, such as found in a closed/managed cable television system, multicasting is effective for reducing the amount of traffic carried on the network. Because the service delivery network is private, issues of collisions in the address space reserved for multicast streams are not likely and the IPTV operator of the network has complete control over the multicast operation within the network. When a terminal, such as a laptop wishes to access these private multicast packet streams/media content from a public access network, however, this situation no longer holds. In other words, the laptop desires to take advantage of efficient multicast transmission of IPTV services. However, the public access network may not support multicasting. Furthermore, even if multicasting is supported, the multicast transmission may be susceptible to multicast address collision.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

An embodiment of the present invention provides a method to determine whether multicast IP service is available for a device or the device must fall back to a less efficient unicast mechanism for receiving multicast services when the device is in a public access network. In other words, it is a method to determine whether an access network supports multicast streaming from an IPTV service provider. The present invention allows optimized operation of the clients (e.g., terminals), which may operate out of multiple access networks and benefits the owners of both the IPTV service network as an IPTV operator network and the access network.

Embodiments of the present invention provide a mechanism to identify not only that the access network supports reception of a multicast stream, but that the correct stream is being received. Multiple methods maybe used to determine not only that an IGMP (Internet Group Management Protocol) join operation succeeded, but also to determine that data being received is the correct data. IGMP is an extension to the Internet Protocol, used by IP hosts to report their host group memberships to immediately neighboring multicast routers. IGMP join is an operation used by a client to join a multicast group. An IGMP join operation may succeed. However, this does not indicate that intended content is streaming to the client since there may be collisions of the IGMP group addresses causing the client to receive content that is different what was sent by the IPTV service provider.

IGMP defines how a terminal requests that a multicast stream be received on a subnet it is a member of. IGMP requests cause routers to start forwarding a packet into the subnet. If the router cannot see the stream on its upstream port, it issues IGMP requests to the next higher router, until a router is identified which does have the stream.

Figure 1:
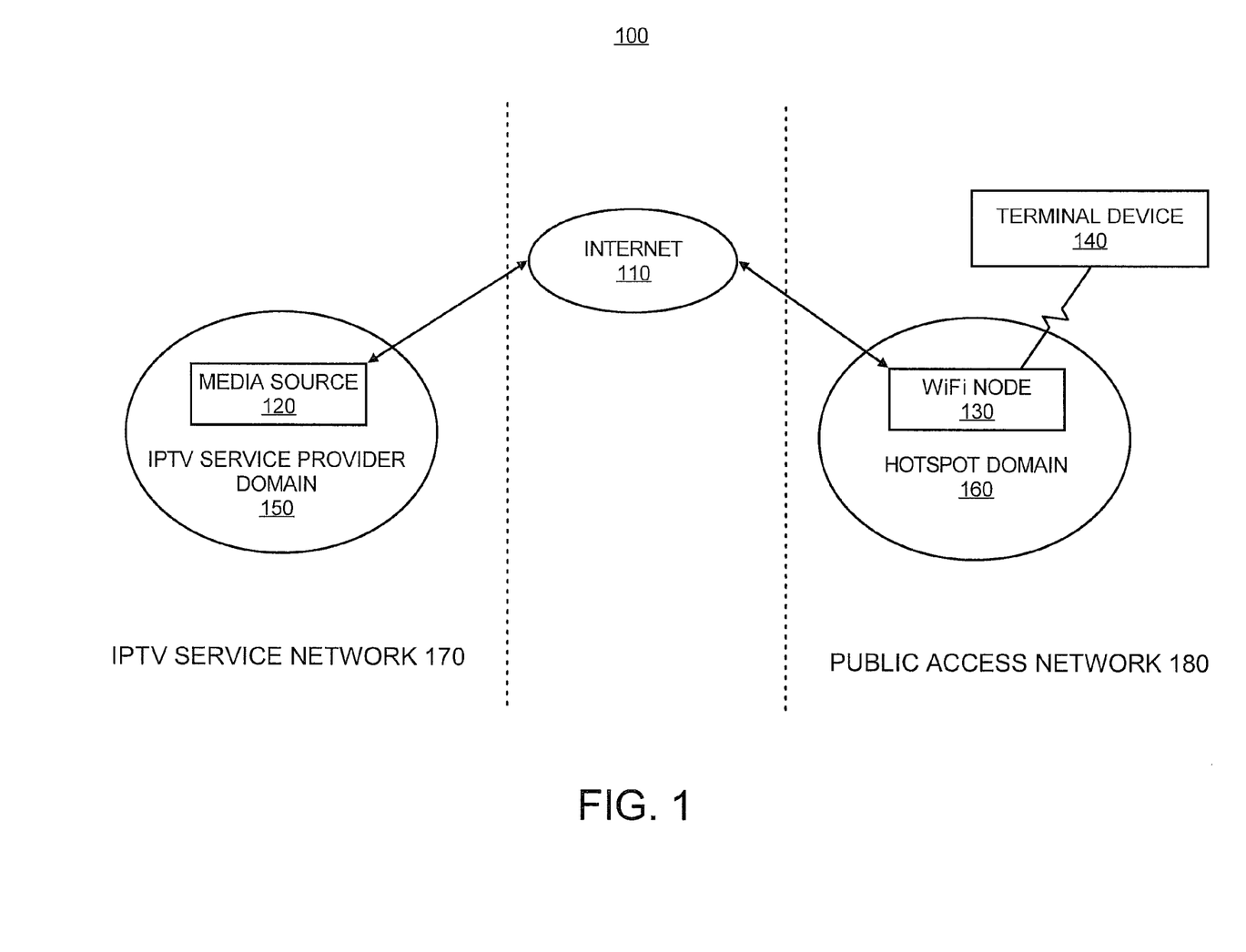
FIG. 1 shows a simplified block diagram of devices in an IPTV service network and a public access network, according to an embodiment of the present invention.

A terminal is a device operable to send and/or receive data via a network. Terminal is also referred to as a terminal device or client. When a terminal, such as a laptop, a 3G (3rd Generation) mobile phone, or a DMV (Digital Media Viewer) wishes to access IPTV services from a public access network, some means is needed to route the multicast-based IPTV stream between the IPTV service provider's private/closed network and the public access network. An example of this configuration is shown in FIG. 1. FIG. 1 illustrates a simplified block diagram of devices in a wireless network interface 100 according to an embodiment of the present invention. The wireless network interface 100 includes an IPTV service network 170 and a public access network 180. The IPTV service provider domain 150 serves media source 120 and routers (not shown) in the IPTV service network 170 and the hotspot domain 160 serves WiFi server 130 and routers (not shown) in the public access network 180. The media source 120 streams media content that is multicasted to devices in the IPTV service provider domain 150.

In FIG. 1, the terminal device 140, for example, a laptop is configured to access media content from the IPTV service network 170 via Internet 110. The terminal device 140 is then carried to a hotspot, such as a coffee shop where the WiFi (Wireless Fidelity) node 130 is located. Although the WiFi node 130 is used here as an example, it should be noted that WiMAX (Worldwide Interoperability for Microwave Access), LTE (Long Term Evolution (3GPP 4G technology)), or any other wireless access technologies may be applicable also. The WiFi node 130 may include one or more network devices providing a local wireless network and also providing access to the Internet or/and the network. Of course, it is noted that while a coffee shop situation is described, extensions to other environments, such as in a conference room to an office suite, educational environment, such as in a class room to a library, public space, such as in an airport or other such wirelessly networked places where a hotspot is available are analogous.

The user of the terminal device 140 would like to continue to be able to access a media stream that is part of data stored in the media source 120, but it is not certain that the media stream can continue to be received via multicast mode in the hotspot domain 160 area. Even if a network operator of the IPTV service network 170 has configured the IPTV service network 170 to provide a multicast-based IPTV stream onto the Internet 110, the public access network 180 also needs to support IPTV multicast operation on the routers in the public access network 180. Further, there must not be any collision between multicast stream addresses between IPTV operators. A collision may occur if other IPTV service providers are using the same multicast address to send data.

When the terminal device 140 is registering with the media source 120 through a private network tunnel, or other security means, which may be specific to the network being accessed, the terminal device 140 needs to indicate and use the appropriate unicast or multicast data delivery mechanism to receive the IPTV services. The indication may be based on whether it is able to receive the multicast streams from the IPTV service provider domain 150 via the public access network 180. The terminal device 140 is currently wirelessly connected to the WiFi server 130 that is in the Hotspot domain 160 in the public access network 180.

If the multicast streams are available, the terminal device 140 uses IGMP to join and start receiving the IPTV services or the IPTV data streams. If the IPTV services or the IPTV data streams are not available in multicast mode because, for instance, the IPTV services or the IPTV data streams are blocked at a hotspot router or another point in the internet, then the terminal device 140 will use a method to request a unicast version of the IPTV services or the IPTV data streams from the media source 120. An IPTV service provider may have a desire to limit the number of unicast streams, which must be provided, as this requires additional resources on the gateway.

In one embodiment according to the present invention, on attaching or connecting into the public access network 180, while trying to establish a connection back to the media source 120, the terminal device 140 will attempt to join to a multicast group which carries an encoded 'tone' signal (not shown). The multicast address for the 'tone' signal should be a well-known and reserved multicast address. This is the key to identifying desired data from unwanted data, which may result from an address collision. This tone signal serves to indicate that the public access network 180 is able to receive multicast streams from the IPTV service provider domain 150. The encoding of the tone signal is such that the IPTV service provider domain 150 is uniquely identified, and protects against collisions where two different IPTV operators may use the same set of multicast addresses.

If the 'tone' signal does not include the tone signal of the IPTV service provider, then the terminal device 140 assumes that the multicast stream is not actually present in the public access network 180, even through the IGMP join operation was succeeded. A requirement is that a low bandwidth multicast stream is generated from the media source 120 within the IPTV service network 170, this stream is then routed as the other multicast streams are.

According to an embodiment, as an additional aid to the terminal device 140 attempting to use IPTV services, the tone signal may also encode information about the channels which are available for multicast outside of the core network. This tone signal contains information, which identifies the IPTV operator who is providing this multicast address and information about the available services. This information can be used by the terminal device 140 to decide a channel. The terminal device 140 normally would receive the channel via multicast. The terminal device 140 decides whether it would be able to receive an IPTV multicasted stream when in a public access network, or would need to request a unicast delivery mode. Verification of the tone signal is based on the IPTV operator information. The IPTV operator information may be a fixed string, which is verified by the terminal device 140.

However, the information in the tone signal may change periodically, and the current value of the tone signal is obtained by the terminal device 140 when it registers with the media source 120 in the core network. In one embodiment, the tone signal may be embedded within other data, such as an EPG (Electronic Program Guide) on the system, which may be transmitted on a multicast address that the terminal device 140 uses to initialize normally. Therefore, according to the present invention, it is important to use the tone signal to validate that multicast reception is working, and to determine that the correct stream is received from the desired IPTV service provider/operator.

To protect against situations where some of the channels being used have collisions with other networks and the tone stream is not affected, the other streams should also have some form of source identification to identify the network which sourced the stream, so that the terminal device 140 can identify this error condition. If a given multicast stream is not being received properly, the terminal device 140 should then change to a unicast mode of operation to receive the stream from the IPTV service network 170.

An alternate embodiment to resolve the problem of determining if the public access network 180 is able to receive desired multicast streams is to use location knowledge that the core network servers may possess. In this case, the terminal device 140, upon registering, provides information about the public access network 180. The core network server compares this information against a list of known access networks and the multicast support of those different access networks. If the access network that the terminal device 140 belongs to is known to be multicast friendly for that IPTV operator, then the information returned in the registration response indicates that the access network also is able to support multicast streams. The terminal device 140 then uses this information from the registration response to request appropriate network services.

An embodiment of a method in which the network 100 shown in FIG. 1 may be employed for identifying whether it shall request unicast delivery modes, or whether it should use the multicast mode of service delivery will now be described with respect to the following flow diagram of the method 200 depicted in FIG. 2. It should be apparent to those of ordinary skill in the art that the method 200 represents a generalized illustration and that other steps may be added or existing steps may be removed, modified or rearranged without departing from the scopes of the method 200. Also, the method 200 is described with respect to the wireless network 100 by way of example and not limitation, and the method 200 may be used in other systems or other types of networks, wired or wireless.

Figure 2:
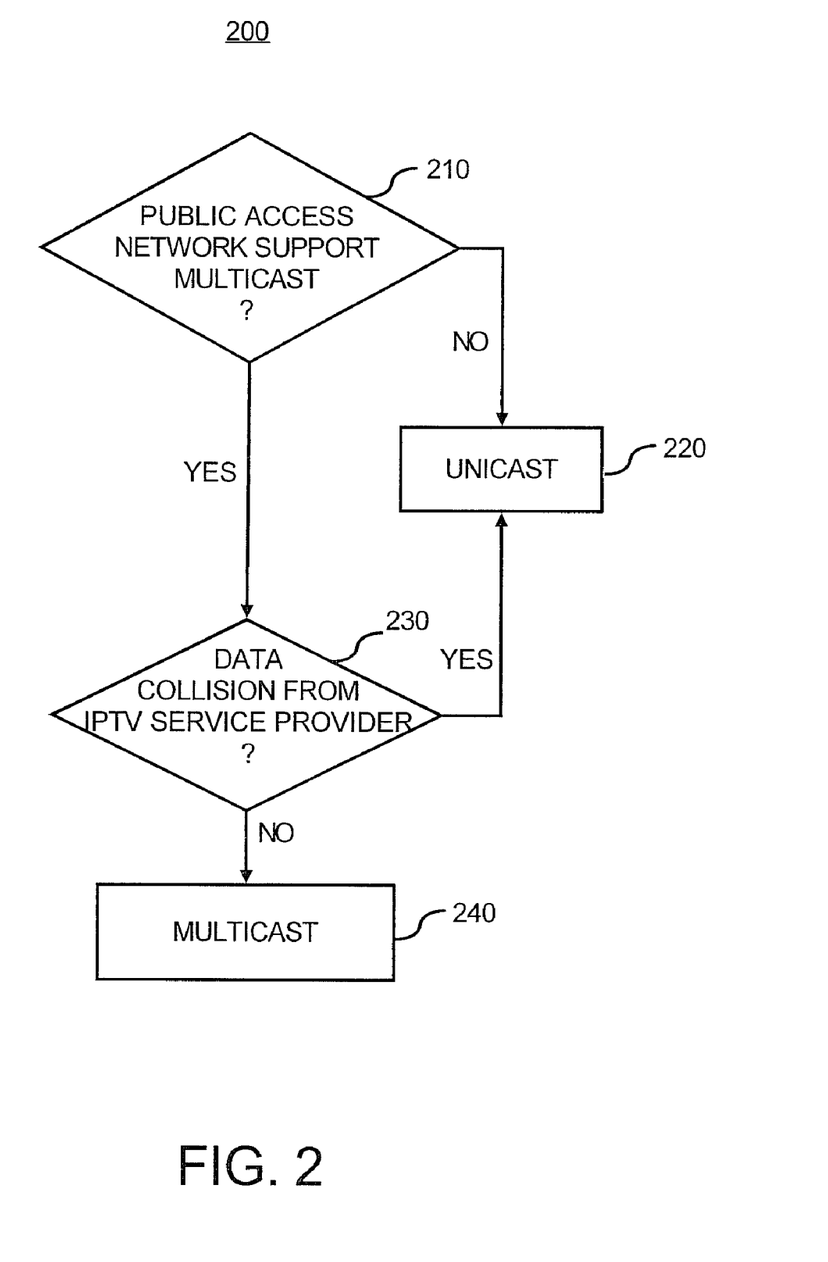
FIG. 2 illustrates a flowchart for a method to determine whether a terminal in an access network shall request a unicast or a multicast operation, according to an embodiment of the present invention.

FIG. 2 illustrates a flowchart used by the client to identify whether it shall request IPTV services to be delivered in unicast mode, or it should use the multicast mode of delivery. In this embodiment, it is assumed that the client is able to support both modes of operation, unicast and multicast. The client is expected to be able to support multicast modes of operation when it is in the IPTV service provider's access network. The use of unicast mode is to allow operation from other public access networks.

At step 210, the client, such as the terminal device 140 in FIG. 1, verifies whether the public access network 180 supports multicast delivery modes. Multicast delivery mode means the network or network device is multicasting. Some network devices may be capable of operating in multiple delivery modes, such as unicast or multicast modes. If the public access network 180 does not support multicast delivery modes, the client requests unicast delivery modes at step 220. If the public access network 180 supports multicast delivery modes, then the client device checks whether there is a data collision from the IPTV service provider at step 230. If there is a data collision from the IPTV service provider, then the client device requests unicast delivery modes. If there is no data collision from the IPTV service provider, the client device requests multicast delivery modes at step 240.

An embodiment of a method in which the network 100 as well as the method 200 may be employed for determining whether an access network supports multicast-based IPTV from an IPTV service provider will now be described with respect to the following flowchart of the methods 300 and 400 depicted in FIGS. 3 and 4, respectively. It should be apparent to those of ordinary skill in the art that the methods 300 and 400 represent a generalized illustration and that other steps may be added or existing steps may be removed, modified or rearranged without departing from the scopes of the methods 300 and 400. In addition, the methods 300 and 400 are described with respect to the network 100 and the method 200 by way of example and not limitation, and the methods 300 and 400 may be performed in other types of networks that may be wired or wireless.

Figure 3:
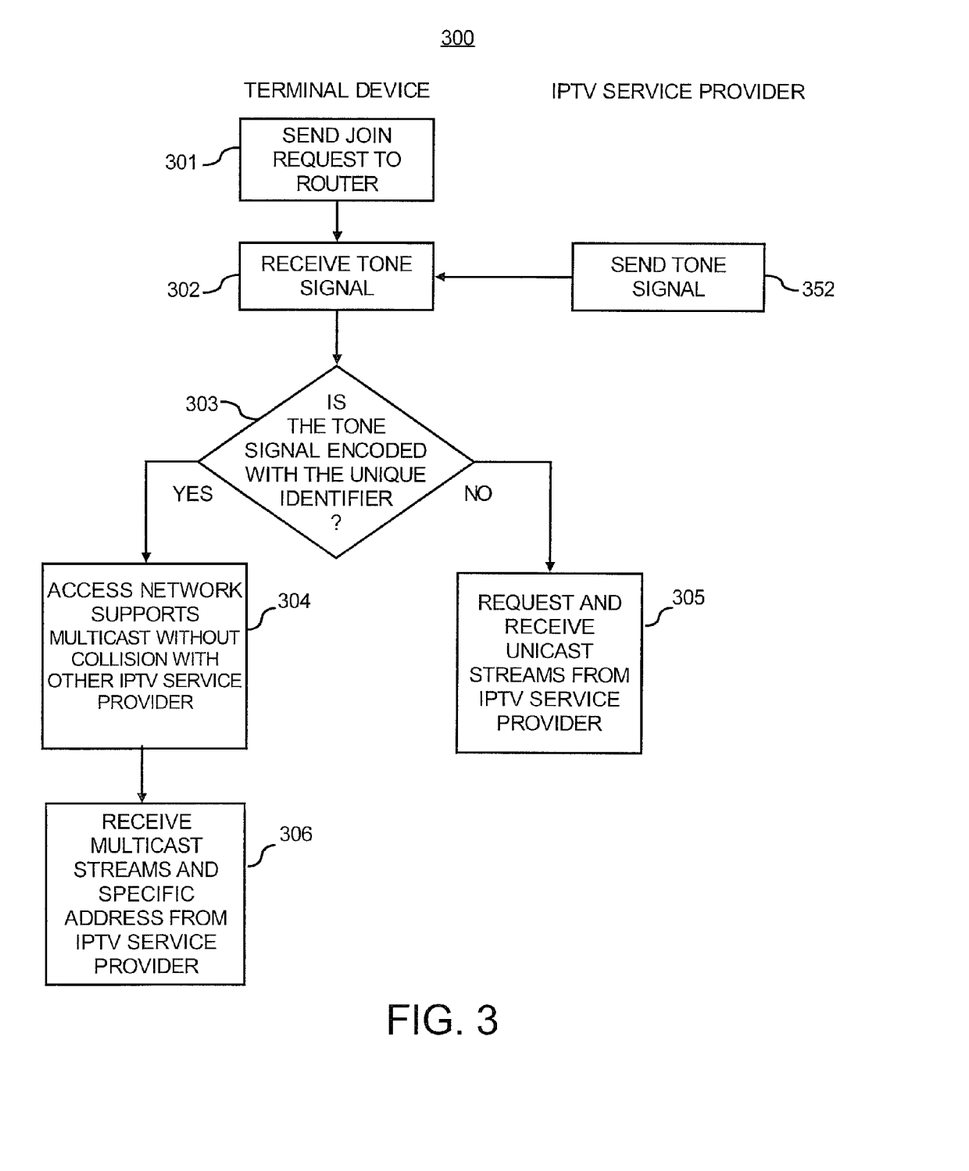
FIG. 3 illustrates a flowchart of a method for determining whether an access network supports multicast-based IPTV services from an IPTV service provider using a tone signal, according to an embodiment of the present invention.

FIG. 3 illustrates a flowchart of a method 300 for determining whether an access network supports multicast-based IPTV services from an IPTV service provider in a wireless IPTV service network using a tone signal, according to an embodiment of the present invention.

At step 301, the client, such as the terminal device 140 in FIG. 1, sends to router a request to join a well known multicast IP address for the IPTV service provider from an access network. The request is a message that invokes the method 300. Here, the request to join a multicast IP address may be an IGMP join requests and the IGMP join requests are sent to and dealt with by the multicast enabled gateway/router.

At step 352, the IPTV service provider sends a tone signal to the client device. For example, after the client successfully joins the known multicast IP address, the IPTV service provider sends a tone signal to the client device via the access network and the client device receives the tone signal. The tone signal is multicasted using the multicast IP address from the IPTV network.

At step 302, the client device receives the tone signal via the access network. At step 303, the client device determines whether the tone signal is encoded with a unique identifier of the IPTV service provider. The tone signal may further encode information identifying multicast IP addresses for receiving different IPTV channels from the IPTV service provider.

At step 304, the client device determines the access network supports the multicast-based IPTV services from the IPTV service provider in response to determining the tone signal is encoded with a unique identifier of the IPTV service provider. Then, at step 306, the client device may receive multicasted streams from the IPTV service provider via the access network and store the content from the streams for playback.

At step 305, if the tone signal is not encoded with a unique identifier of the IPTV service provider, the client device determines the access network does not support multicast-based IPTV services from the IPTV service provider. Then, the client device may request unicast delivery of the IPTV services from the IPTV service provider.

It should be noted, that after step 301, if a tone signal is not received, for example within a predetermined period of time, the client device may determine the access network does not support multicast-based IPTV services. Also, if the tone signal is received, but the tone signal is not encoded with the unique identifier of the IPTV service provider as determined at step 305, there may be collisions with another IPTV service provider on the access network. However, if the tone signal, which is transmitted on the known multicast address for the IPTV service provider, is received via the access network and is encoded with the unique identifier of the IPTV service provider as determined at step 304, then the client device can assume there will be no collisions with other multicasting IPTV service providers on the access network.

Figure 4:
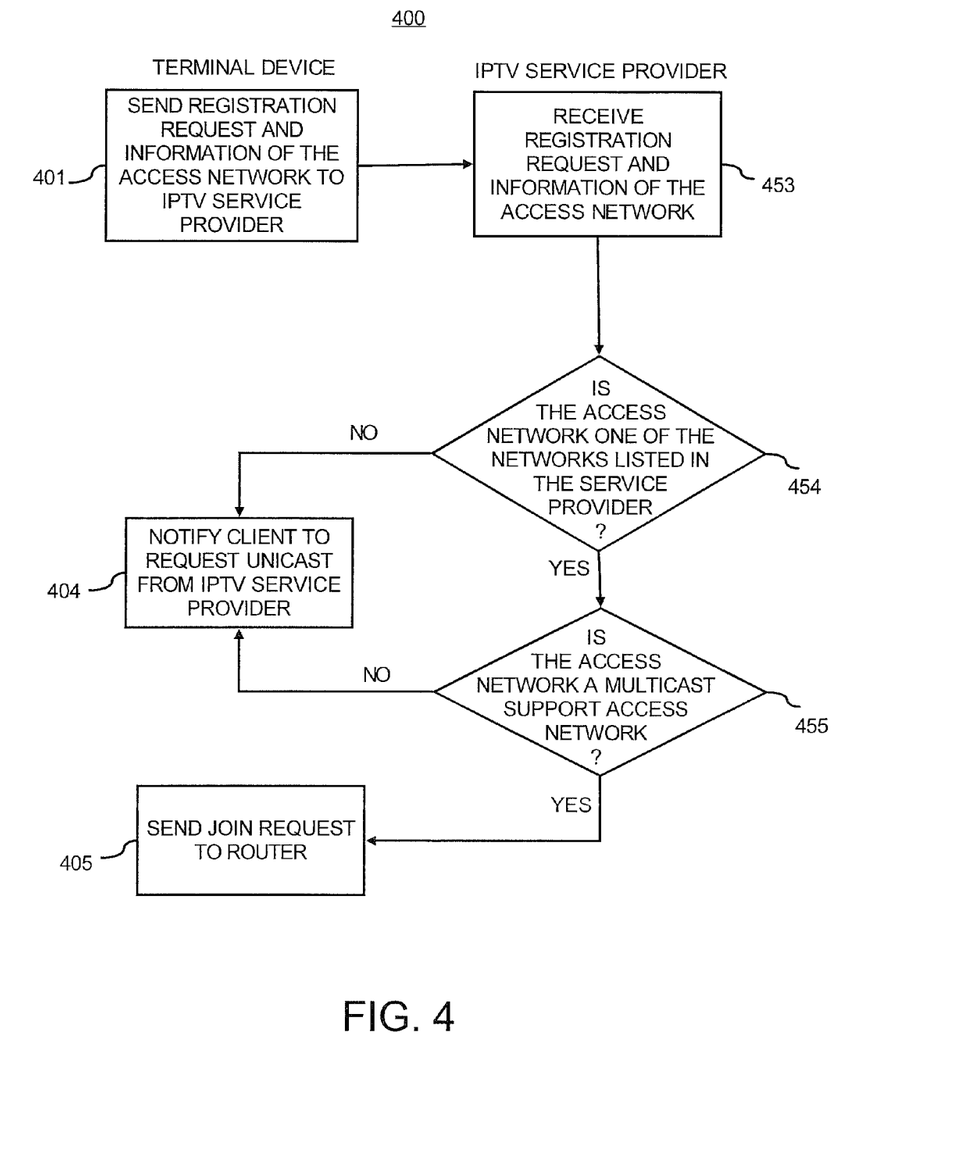
FIG. 4 illustrates a flowchart of a method for determining whether an access network supports multicast-based IPTV services from an IPTV service provider using predetermined knowledge, according to an embodiment of the present invention.

FIG. 4 illustrates a flowchart of a method 400 for determining whether an access network supports multicast-based IPTV from an IPTV service provider in a wireless IPTV service network using predetermined knowledge about access networks at the IPTV service provider, according to an embodiment of the present invention.

At step 401, a client device, such as the terminal device 140 in FIG. 1, sends a registration request to the IPTV service provider from an access network. The request is a message that invokes the method 400. Here, the registration request is different from an IGMP join request sent to a multicast enabled gateway/router. Instead, the registration request is sent to the IPTV service provider at a known address.

The registration request includes information of the access network. The information of the access network may include but is not limited to a known multicast IP address and a domain name of the access network. At step 453, the IPTV service provider receives the registration request, including the information of the access network.

At step 454, the IPTV service provider determines whether the access network is a known or a predetermined access network to the IPTV service provider based on the information provided by the client device in the registration request. In one embodiment, the IPTV service provider checks if the access network is one of the networks pre-listed in the IPTV service provider to determine whether the access network is a known or a predetermined access network to the IPTV service provider using, for example, the domain name or other identification information in the registration request. If the access network is known (e.g., pre-listed), then at step 455, the IPTV service provider determines whether the access network supports multicast-based IPTV services based on the information provided by the client device. For example, the listing of access networks at the service provider may identify which access network supports multicast-based IPTV services.

If the IPTV service provider determines that the access network is a known access network to the IPTV service provider and supports multicast-based IPTV services, then the IPTV service provider sends a message indicating that the client device can receive multicast-based IPTV services from the IPTV service provider via the access network. Then, at step 405, the client device receives the message from the IPTV service provider indicating the access network supports multicast-based IPTV services. Then, at step 406, the client device joins the multicast address for the IPTV service provider to receive the multicast-based IPTV services. This may include sending an IGMP join request to a known multicast address, and receiving a successful join response from a multicast router responding to the request.

At step 404, the IPTV service provider notifies the client device to request unicast-based IPTV services if the IPTV service provider determines that the access network is not a known access network to the IPTV service provider and/or if the access network is determined not to support multicast-based IPTV services. Using the method 400, the client device selects a multicast-based IPTV service if the access network supports the multicast-based IPTV service and the multicast delivery mode and the client device selects a unicast based IPTV service if the access network supports neither the multicast-based IPTV service nor the multicast delivery mode.

Figure 5:
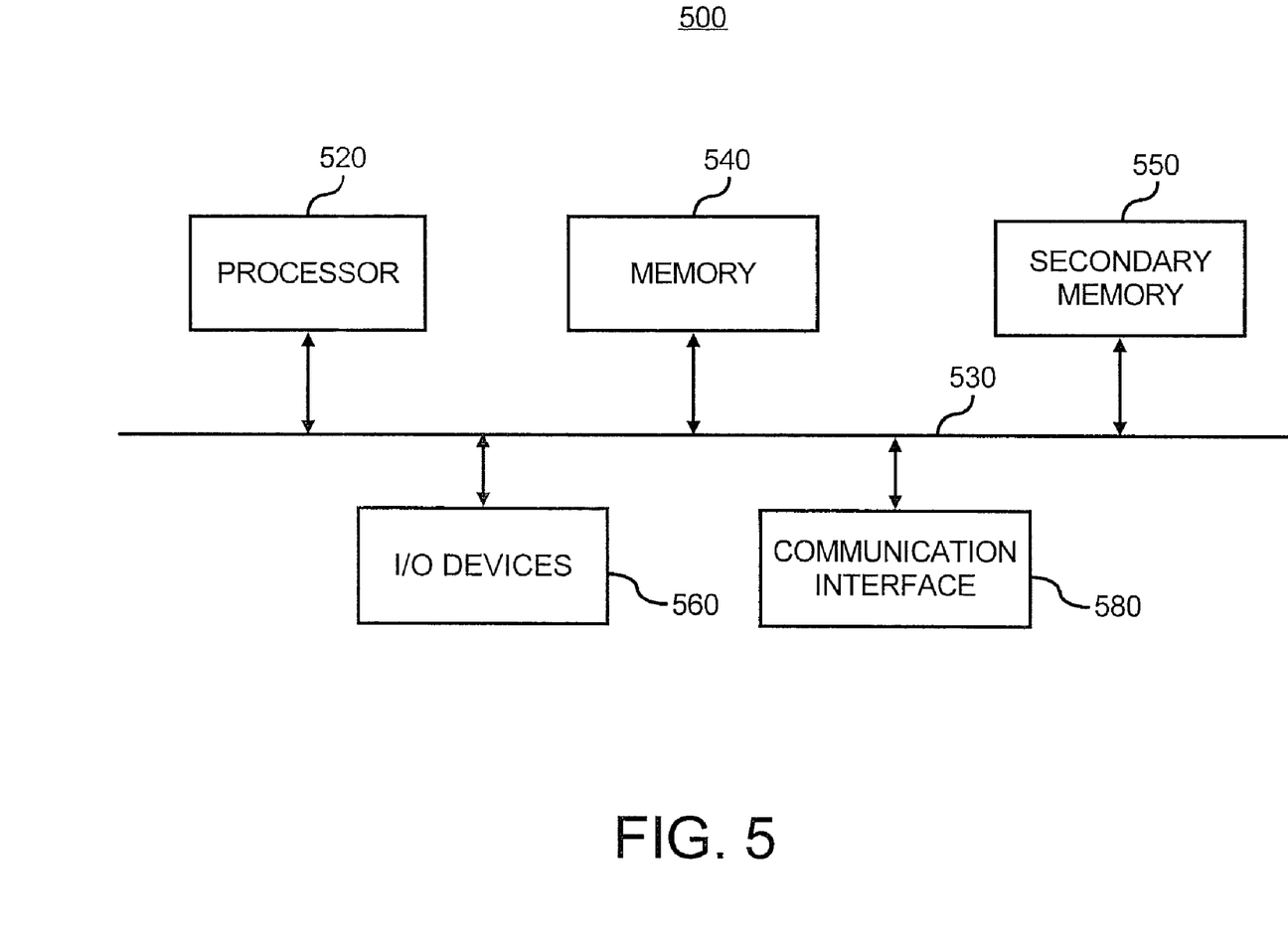
FIG. 5 shows a block diagram of a computer system that may be used as a platform for devices shown in FIG. 1, according to an embodiment of the present invention.

FIG. 5 shows the block diagram of a computer system 500 that may be used as a platform for a terminal device. The computer system 500 may also be used to execute one or more computer programs performing the methods, steps and functions described herein. The computer programs are stored in computer storage mediums.

The computer system 500 includes a processor 520, providing an execution platform for executing software. Commands and data from the processor 520 are communicated over a communication bus 530. The processor 520 is configured to decode the tone signal encoded with a unique identifier of the IPTV service provider. The processor 520 is further configured to derive information of the wireless access network, and to verify the tone signal and the information of the wireless access network.

The computer system 500 also includes a main memory 540, such as a Random Access Memory (RAM), where software may reside during runtime, and a secondary memory 550. The secondary memory 550 may include, for example, a nonvolatile memory where a copy of software is stored. In one example, the secondary memory 550 also includes ROM (read only memory), EPROM (erasable, programmable ROM), EEPROM (electrically erasable, programmable ROM), and other data storage devices, include hard disks. The main memory 540 and the secondary memory 550 stores the tone signal, the information of the wireless access network and streamed IPTV content.

The computer system 500 includes I/O devices 560. The I/O devices may include a display and/or user interfaces comprising one or more I/O devices, such as a keyboard, a mouse, a stylus, speaker, and the like. A communication interface 580 is provided for communicating with other components. The communication interface 580 may be a wireless interface. The communication interface 580 may be a network interface. The communication interface 580 is configured to wirelessly receive a tone signal via the access network, when the tone signal is multicasted using a multicast IP address from the IPTV service provider.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method of determining whether an access network supports multicast-based IPTV (Internet Protocol TV) services from an IPTV service provider, the method comprising:
a terminal sending a request to join a known multicast IP address for the IPTV service provider via the access network to a router, wherein the known multicast IP address is specific to the IPTV service provider;
receiving a tone signal via the access network, wherein the tone signal is multicasted from the IPTV service provider to multiple terminals using the multicast IP address from the IPTV service provider and the tone signal identifies the IPTV service provider providing the multicast IP address and describes services available from the IPTV service provider;
determining whether the tone signal is encoded with a unique identifier of the IPTV service provider; and
determining whether the access network supports the multicast-based IPTV services from the IPTV service provider in response to determining the tone signal is encoded with the unique identifier of the IPTV service provider.

2. The method of claim 1, further comprising:
determining the multicast-based IPTV services from the IPTV service provider are operable to be received via the access network without collisions with a multicast-based IPTV service from another IPTV service provider.

3. The method of claim 1, further comprising:
receiving multicasted IPTV streams from the IPTV service provider via the access network at the terminal.

4. The method of claim 1, further comprising:
if the join is successful, receiving the multicast-based IPTV services; and
determining whether the received multicast-based IPTV services include the tone signal.

5. The method of claim 1, further comprising:
selecting a multicast delivery mode if the access network supports the multicast-based IPTV services; and
selecting a unicast delivery mode if the access network does not support the multicast-based IPTV services.

6. The method of claim 1, wherein the tone signal further encodes information of IPTV channels from the IPTV service provider.

7. The method of claim 1, wherein the access network is a public access network.

8. The method of claim 1, wherein the access network is a wireless network including end user home devices.

9. A terminal device configured to communicate with an IPTV (Internet Protocol TV) service provider via an access network, the terminal device comprising:
an interface configured to wirelessly send a request to join a known multicast IP address for the IPTV service provider to a router via the access network and is configured to wirelessly receive a tone signal from the IPTV service provider to multiple terminal devices via the known multicast IP address, wherein the tone signal is multicasted using the multicast IP address from the IPTV service provider to multiple terminal devices, the tone signal encoded with a unique identifier of the IPTV service provider identifying the IPTV service provider providing the multicast IP address and describing services available from the IPTV service provider; and a processor configured to decode the tone signal for determining whether the tone signal is encoded with the unique identifier of the IPTV service provider, wherein the processor is further configured to determine the access network supports IPTV-based multicasting from the IPTV service provider in response to the tone signal being encoded with the unique identifier of the IPTV service provider.

10. The device of claim 9, wherein the processor is further configured to determine the access network does not support IPTV-based multicasting from the IPTV service provider in response to not receiving the tone signal or the tone signal not being encoded with the unique identifier of the IPTV service provider.

11. The device of claim 10, wherein the processor is further configured to request unicast-based IPTV services from the IPTV service provider in response to determining the access network does not support IPTV-based multicasting from the IPTV service provider.

12. The device of claim 9, wherein the processor is further configured to determine there will be no collision with other IPTV-based multicasting services from other IPTV service providers on the access network in response to the tone signal being encoded with the unique identifier of the IPTV service provider.

13. The device of claim 9, wherein the access network is a wireless network.

* * * * *